Oct. 25, 1938.                I. CABASSA                2,134,599

AUTOMOBILE SUSPENSION SYSTEM

Filed Nov. 22, 1937

Inventor

Irving Cabassa

By Clarence A. O'Brien
Hyman Berman
Attorneys

Patented Oct. 25, 1938

2,134,599

UNITED STATES PATENT OFFICE 2,134,599

AUTOMOBILE SUSPENSION SYSTEM

Irving Cabassa, Alliance, Ohio

Application November 22, 1937, Serial No. 175,969

1 Claim. (Cl. 267—20)

This invention relates to a vehicle suspension system of the type equipped with individual wheel suspensions, and an object of the present invention is to improve the pivotal connections between the frame of the vehicle and the lower pivotal arms that serve to connect the wheel assemblies of a motor vehicle with the frame of the vehicle; such automobile suspension systems being otherwise known as the "parallelogram" linkage system.

The invention together with its objects and advantages will be best understood from a study of the following description taken in connection with the accompanying drawing wherein:—

Figure 1:
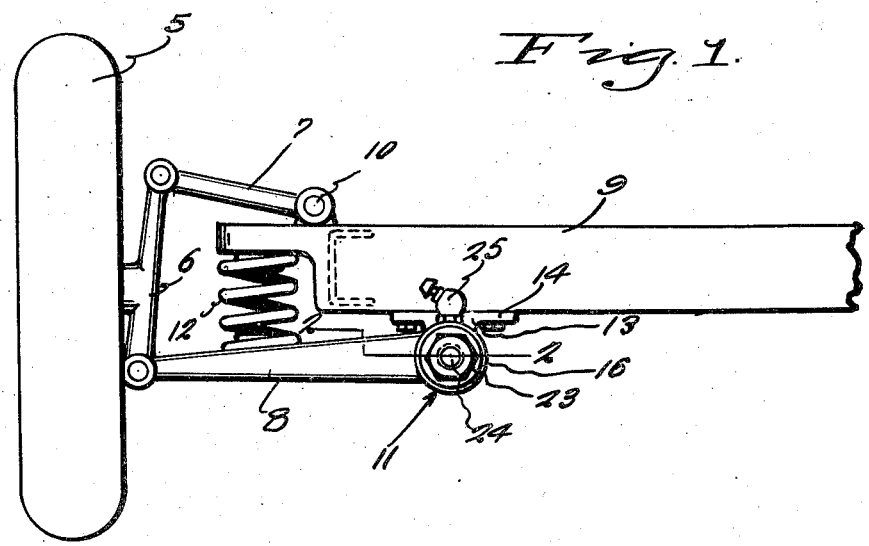
Figure 2:
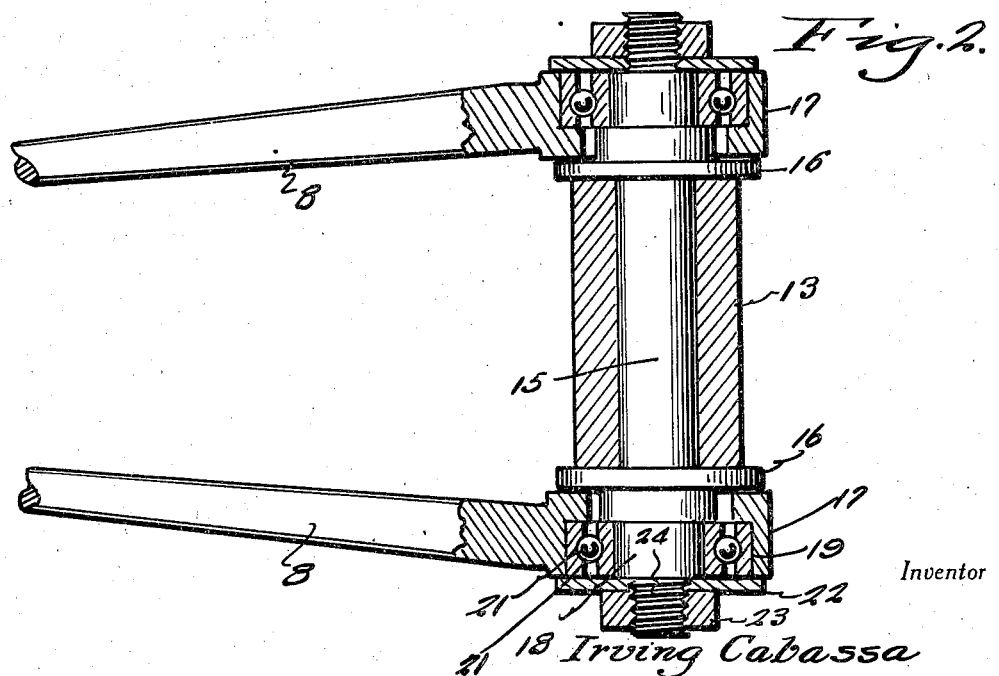

Figure 1 is a fragmentary detail elevational view illustrating the application of the invention, and Figure 2 is an enlarged detail sectional view taken substantially on the line 2—2 of Figure 1.

Referring to the drawing by reference numerals it will be seen that the dirigible road wheel 5 of the vehicle is carried on a wheel-supporting member, such as a knuckle bracket support member 6.

As is well-known in the art the knuckle bracket support member 6 is pivotally mounted between the outer ends of laterally extending links 7 and 8—V-shaped in plan, which are pivoted one above the other to the front cross member 9 of the vehicle frame, so as to be capable of swinging motion in a substantially vertical plane. The pivot axis for the link 7 is conventional and indicated by the reference numeral 10 while the pivot axis for the link 8 is indicated by the reference numeral 11 and it is to improvements in this pivot axis 11 to which the present invention is directed.

As may be also noted, and as shown, there is interposed between the link 8 and the frame cross member 9 a coil spring 12 that resiliently restrains upward swinging movement of the linkage relative to the frame of the vehicle.

In accordance with the present invention the pivot axis 11 for the link 8 embodies, as is somewhat conventional, a bearing bracket 13 bolted or otherwise secured to the underside of the frame member 9 as at 14. Extending through the bracket 13 is a pivot rod 15, and in accordance with the present invention the pivot rod 15 inwardly from the respective opposite ends thereof is provided with collars 16 which accommodate therebetween the bearing bracket 13.

Also at each end thereof the bearing rod 15 is adapted to be accommodated within the bearing eye 17, the arms of the V-shaped link 8 at the free ends thereof being provided with such bearing eyes 17 as shown.

At said ends thereof the pivot rod 15 is reduced in diameter as at 18 and the bearing eyes 17 of the arms of link 8 are provided with internal grooves or recesses 19 that are concentric to the reduced portions 18 of the pivot rod 15 in order to accommodate, as clearly shown in Figure 2, suitable bearing assemblies 21.

The bearing assemblies 21 are retained within the eyes 17 through the medium of washers or cover plates 22 and nuts 23 threaded on the terminals 24 of the pivot rod 15.

A salient feature of the present invention is in providing the bearings 21 whereby friction is reduced to a minimum to the end that very little if any wear will take place so that at all times a good fit between the bearing eye-equipped ends of the arms of link 8 and the pivot rod 15 will be had.

In this connection it may be stated that an objection to the present type of pivot axis for the lower link corresponding to the link 8 in this type of independent wheel suspension is the constant wear on the parts with consequent loss of efficiency.

Also for maintaining the parts well lubricated the bearing eye 17 on each of the link arms is equipped with a lubricant fitting 25 of any suitable and well-known construction.

It will thus be seen that in accordance with the present invention an efficient yet simple type of pivotal connection between the link 8 and the frame 9 is had and that such connection embodying anti-friction devices as illustrated and being so equipped so as to be well lubricated at all times, wear on the parts will be reduced to a minimum and the action of the parts more positive and efficient over a greater period of time.

It is thought that a clear understanding of the construction, utility and advantages of an invention of this character will be had without a more detailed description.

Having thus described the invention what is claimed as new is:—

In an independent wheel suspension for a vehicle embodying a chassis, means for supporting a wheel spindle, and means flexibly connecting said supporting means to said chassis including a bracket fixed to the chassis, a pivot rod extending through the bracket with its opposite ends extending beyond the same, said rod having a pair of disk-like collars fitting against opposite sides of the bracket, respectively, and threaded terminals, and being stepped intermediate the collars and terminals at each end to provide a pair of shoulders thereon adjacent the collars, respectively, and reduced portions intermediate said shoulders and terminals, a V-shaped lower link pivotally connected at its convergent end to said supporting means and having bearing eyes at its divergent ends surrounding said rod intermediate the collars and terminals in spaced relation thereto, anti-friction assemblies countersunk in the outer faces of the bearing eyes and fitting over said reduced portions, a pair of washers on said threaded terminals covering the anti-friction assemblies, and nuts on said threaded terminals bearing against the washers.

IRVING CABASSA.